(12) United States Patent
Park

(10) Patent No.: US 8,621,483 B2
(45) Date of Patent: Dec. 31, 2013

(54) METHODS, APPARATUSES AND COMPUTER PROGRAM PRODUCTS FOR PROVISIONING APPLICATIONS TO IN VEHICLE INFOTAINMENT SYSTEMS WITH SECURED ACCESS

(75) Inventor: Keun-young Park, Mountain View, CA (US)

(73) Assignee: Nokia Corporation, Espoo (FI)

( * ) Notice: Subject to any disclaimer, the term of this patent is extended or adjusted under 35 U.S.C. 154(b) by 221 days.

(21) Appl. No.: 13/164,503

(22) Filed: Jun. 20, 2011

(65) Prior Publication Data

US 2012/0324482 A1    Dec. 20, 2012

(51) Int. Cl.
*G06F 13/00*    (2006.01)
(52) U.S. Cl.
USPC .......................................... 719/311; 719/328
(58) Field of Classification Search
USPC .................................. 719/311, 328
See application file for complete search history.

(56) References Cited

U.S. PATENT DOCUMENTS

| | | | | |
|---|---|---|---|---|
| 7,509,658 | B2 * | 3/2009 | Goring et al. | 719/328 |
| 8,055,874 | B2 * | 11/2011 | Kim | 711/171 |
| 2003/0220725 | A1 | 11/2003 | Harter, Jr. et al. | |
| 2006/0036356 | A1 | 2/2006 | Rasin et al. | |
| 2007/0027814 | A1 * | 2/2007 | Tuoriniemi | 705/59 |
| 2009/0075624 | A1 | 3/2009 | Cox et al. | |
| 2009/0119678 | A1 * | 5/2009 | Shih et al. | 719/313 |
| 2009/0298465 | A1 * | 12/2009 | Choi et al. | 455/406 |
| 2010/0262619 | A1 * | 10/2010 | Zargahi et al. | 707/770 |
| 2010/0332613 | A1 | 12/2010 | Brakensiek | |
| 2011/0214162 | A1 | 9/2011 | Brakensiek et al. | |
| 2012/0023435 | A1 * | 1/2012 | Kneppers et al. | 715/780 |
| 2012/0173612 | A1 * | 7/2012 | Vegesna-Venkata et al. | 709/203 |
| 2013/0018701 | A1 * | 1/2013 | Dusig et al. | 705/7.32 |
| 2013/0028190 | A1 * | 1/2013 | Saedifaez | 370/328 |

OTHER PUBLICATIONS

Bose, Raja, et al., "Morphing Smart-Phones into Automotive Application Platforms," *Computer*, May 2011(date of publication Apr. 7, 2011), vol. 44, No. 5, pp. 53-61, IEEE Computer Society, USA.
Unknown Author, "OASIS: Device Profile for Web Services Version 1.1," Jun. 8, 2011, Internet Archive <http://web.archive.org/web/20110608080810/http://docs.oasis-open.org/ws-dd/dpws/1.1/os/wsdd-dpws-1.1-spec-os.html#_Toc228672102>, 30 pages.

(Continued)

*Primary Examiner* — Andy Ho
(74) *Attorney, Agent, or Firm* — Alston & Bird LLP

(57) ABSTRACT

An apparatus for providing one or more applications to an IVI client device(s) may include a processor and memory storing executable computer code causing the apparatus to at least perform operations including providing an application(s) and associated data to a device in response to receipt of an indication of a selection associated with the application(s). The computer program code may further cause the apparatus to enable the application(s) to access requested data via a plurality of application programming interfaces during execution of the application. The computer program code may further cause the apparatus to provide the requested data to the application in response to receipt of a message(s) generated by a first application programming interface of the interfaces that received a request for the requested data from a second application programming interface of the interfaces. Corresponding methods and computer program products are also provided.

20 Claims, 8 Drawing Sheets

(56) References Cited

OTHER PUBLICATIONS

Unknown Author, "Quick Online Tips—Leveraging Browser Caching to Increase Website Speed," Sep. 21, 2010, Internet Archive <http://web.archive.org/web/20100921110520/http://www.quickonlinetips.com/archives/2010/05/leverage-browser-caching-increase-website-speed/ Section Why browser caching?>, 3 pages.

Covier, Chris, et al., "CSS-Tricks: Override Inline Styles with CSS," Aug. 12, 2010, Internet Archive <http://web.archive.org/web/20100812081349/http://css-tricks.com/override-inline-styles-with-css/?>, 14 pages.

Unknown Author, "Webcredible: The Importance of the !Important CSS Declaration," May 26, 2011, Internet Archive <http://web.archive.org/web/20110526002813/http://www.webcredible.co.uk/user-friendly-resources/web-dev/css-important.shtml>, 3 pages.

Unknown Author, "CSS How To . . . ," Jun. 11, 2011, Internet Archive <http://web.archive.org/web/20110611171744/ http://www.w3schools.com/css/css_howto.asp>, 2 pages.

Sonnenberg, Jan, "A Distributed In-Vehicle Service Architecture Using Dynamically Created Web Services" 2010 IEEE 14th International Symposium on Consumer Electronics, Jun. 7-10, 2010, 5 pages, IEEE, USA.

International Searching Authority, International Search Report and Written Opinion for International Application No. PCT/FI2012/050466, mailed Sep. 21, 2012, 15 pages, National Board of Patents and Registration of Finland, Finland.

Sonnenberg, "Service and User Interface Transfer from Nomadic Devices to Car Infotainment Systems," *Proceedings of the $2^{nd}$ Int'l Conf. on Automotive User Interface and Interactive Vehicular Applications*, Nov. 11-12, 2010, pp. 162-165, Pittsburg, PA.

\* cited by examiner

METHODS, APPARATUSES AND COMPUTER PROGRAM PRODUCTS FOR PROVISIONING APPLICATIONS TO IN VEHICLE INFOTAINMENT SYSTEMS WITH SECURED ACCESS

TECHNOLOGICAL FIELD

An example embodiment of the present invention relates generally to wireless communication technology and more particularly, relates to an apparatus, method and a computer program product for facilitating an efficient and reliable mechanism of providing one or more applications to an in vehicle infotainment (IVI) system of one or more vehicles.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase ease of information transfer relates to services for providing applications to IVI systems of vehicles.

Currently, in the Terminal mode (a new smartphone to car interface developed by Car Connectivity Consortium) an IVI system may utilize Virtual Network Computing (VNC) for replicating a user interface of a mobile phone to a display provided by a vehicle to enable users to utilize the latest or current applications provided by the mobile phone with a vehicle's (for example, an old car) IVI system. When using the VNC connection, the frame rate of an application may be limited by the bandwidth of an underlying network connection between the mobile phone and the IVI system. As such, it may be difficult to support applications that may require high frame rates such as, for example, videos, games, and user interfaces.

One challenge in executing applications downloaded from a mobile device to an IVI system may be the lack of a device application programming interface (API) provided by the IVI system. A device API may refer to a JavaScript API provided to web (e.g., HTML) applications for accessing data from a mobile phone where the application may be running. An example of device APIs may be associated with contacts, calendar, GPS location, etc. Since new device APIs are currently being developed every year, an IVI system developed years ago (for example, in older vehicles) may not have all device APIs necessary to execute an application downloaded from a mobile phone, which tends to support the latest or most current APIs available. Even if a corresponding device API is available via an IVI system, the device API may not be particularly useful for the application. For example, a calendar device API provided by an IVI system may not include a most recent schedule of a user, even though a mobile phone of the user may have a calendar with the user's most recent schedule. However, the user may desire to be able to access his/her most recent schedule even if the application (e.g., a calendar application) is executed in the IVI system.

As a solution to this problem, a current mechanism for an IVI system to obtain device data from a mobile phone using a web interface may be dynamic translation of JavaScript code by replacing a caller of a device API into another code which may fetch necessary data from the mobile phone remotely. However, such a translation may take a long time depending on the amount of code being transmitted and translated. Another problem of current mechanisms for providing device data of a mobile device to an IVI system may involve lack of protection of a user's data. For example, sensitive data such as a user's calendar, contacts, and location may need to be protected to prevent malicious software running in an IVI system or other devices in the same network from accessing such data.

One solution to this issue may be to request a user to enter a password to access sensitive data, but this approach may be unrealistic for usage in vehicles. For example, when a vehicle is being driven by a user, it may be difficult and undesirable for the user to enter a password to access sensitive information. As such, a better mechanism for protecting sensitive data may be needed.

Another problem that may not be addressed by existing mechanisms of providing applications to IVI systems relates to driver distraction rules/regulations. Currently, existing mechanisms may not adequately provide information indicating whether an application being sent to an IVI system meets driver distraction rules/regulations and whether one or more functions of the application may be allowed while driving. As such, lack of such information related to driver distraction rules/regulations may require IVI systems to allow downloaded applications only when a vehicle is completely stopped. However, this may not be the most efficient use of the IVI system and a user may become dissatisfied at being unable to access desired applications while in transit.

In view of the foregoing drawbacks, it may be desirable to provide a more efficient and reliable mechanism of enabling provision of one or more applications to an in vehicle infotainment system.

BRIEF SUMMARY

A method, apparatus and computer program product are therefore provided that may enable provision of one or more applications to an IVI client device in an efficient and reliable manner. In this regard, an example embodiment may enable applications on a mobile device to be provided in a secure manner to an IVI client device that may not initially have a most recent device API for accessing data associated with the applications.

An example embodiment may also enable an IVI client device to obtain information to decide whether a received application(s) is suitable for safe driving or not. An example embodiment may include a permission/capability check for data access to prevent disallowed data access without a user's prior approval.

In addition, an example embodiment may protect private data of a user from malicious applications (e.g., malware). For example, by performing a device discovery and authentication mechanism to verify that a server and a browser being implemented in a communication device and an IVI client device, respectively are authentic and trustworthy an example embodiment may prevent malware in either device (e.g., the communication device, the IVI client device) from faking as an original application since such faking, if unchecked, may enable execution of a harmful application while a user is driving a vehicle or may result in undesirable retrieval of private data of a user.

In one example embodiment, a method for providing one or more applications to one or more IVI client devices is provided. The method may include enabling provision of at least one application and associated data to a device in response to receipt of an indication of a selection associated with the application. The method may further include enabling the application to access requested data via a plurality of application programming interfaces during execution of the application. The method may further include enabling provision of the requested data to the application in response to receipt of at least one message. The message may be generated by a first application programming interface that received a request for the requested data from a second application programming interface.

In another example embodiment, an apparatus for providing one or more applications to one or more IVI client devices is provided. The apparatus may include a processor and memory including computer program code. The memory and the computer program code are configured to, with the processor, cause the apparatus to at least perform operations including enabling provision of at least one application and associated data to a device in response to receipt of an indication of a selection associated with the application. The computer program code may further cause the apparatus to enable the application to access requested data via a plurality of application programming interfaces during execution of the application. The computer program code may further cause the apparatus to enable provision of the requested data to the application in response to receipt of at least one message. The message may be generated by a first application programming interface that received a request for the requested data from a second application programming interface.

In another example embodiment, a computer program product for providing one or more applications to one or more IVI client devices is provided. The computer program product includes at least one tangible computer-readable storage medium having computer-executable program code portions stored therein. The computer-executable program code instructions may include program code instructions configured to enable provision of at least one application and associated data to a device in response to receipt of an indication of a selection associated with the application. The program code instructions may also be configured to enable the application to access requested data via a plurality of application programming interfaces during execution of the application. The program code instructions may also be configured to enable provision of the requested data to the application in response to receipt of at least one message. The message may be generated by a first application programming interface that received a request for the requested data from a second application programming interface.

An example embodiment of the invention may provide a better user experience since a user may be able to provide one or more applications on a communication device to an IVI client device of a vehicle in an efficient and reliable manner. As a result, device users may enjoy improved capabilities with respect to applications and services accessible via communication devices.

BRIEF DESCRIPTION OF THE SEVERAL VIEWS OF THE DRAWINGS

Figure 1:
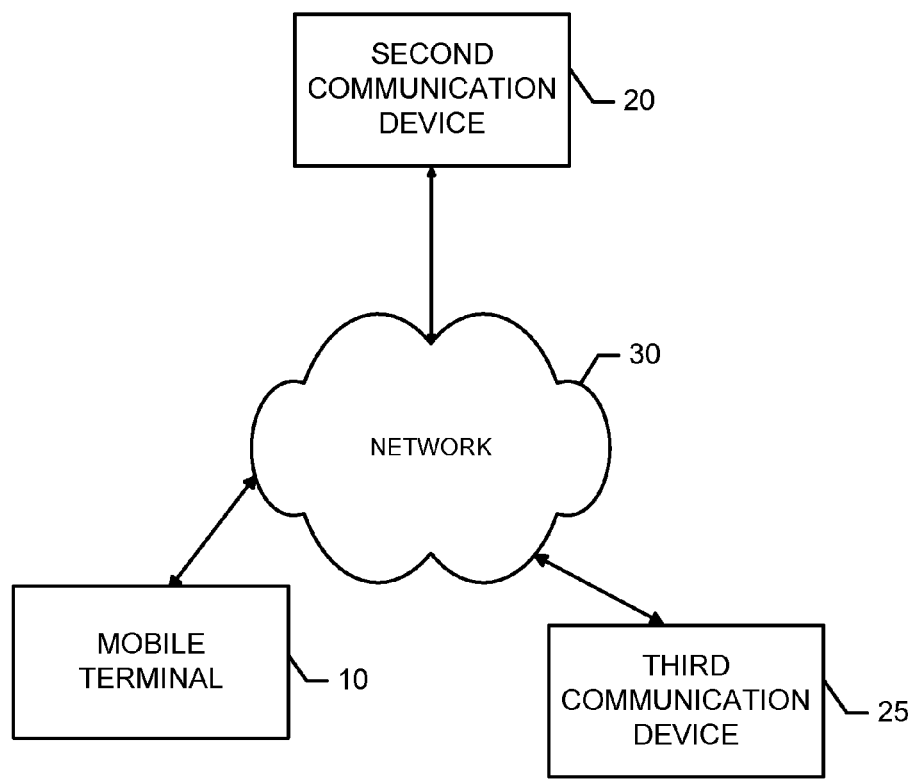
Figure 2:
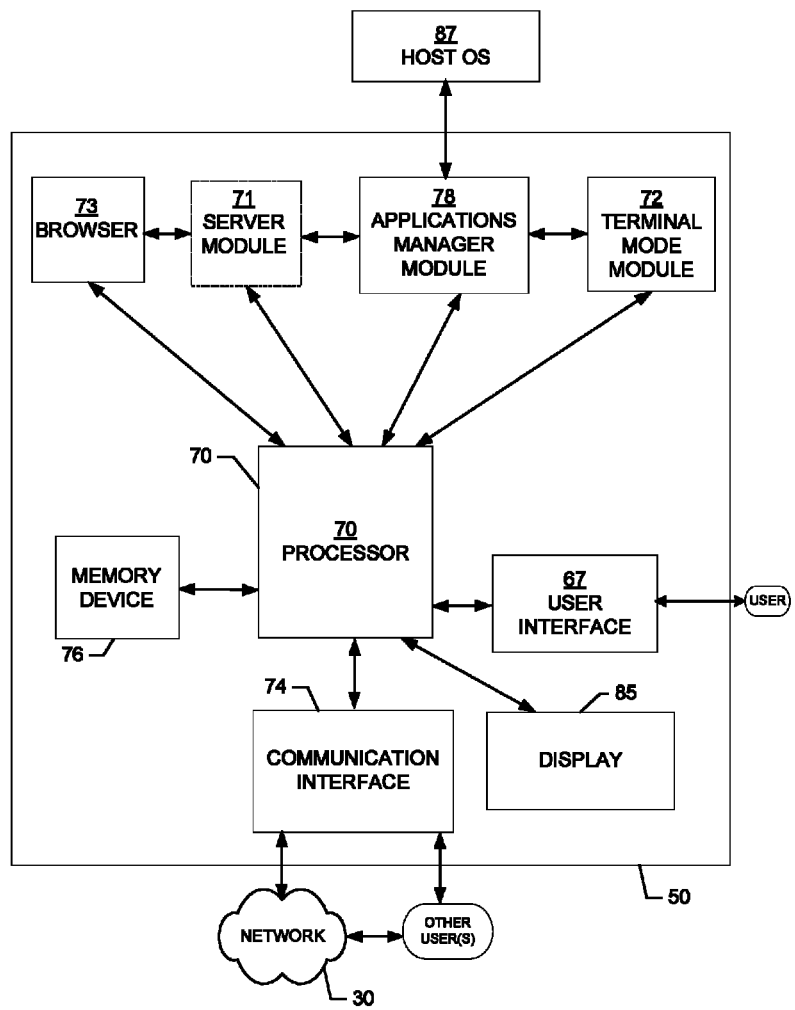
Figure 3:
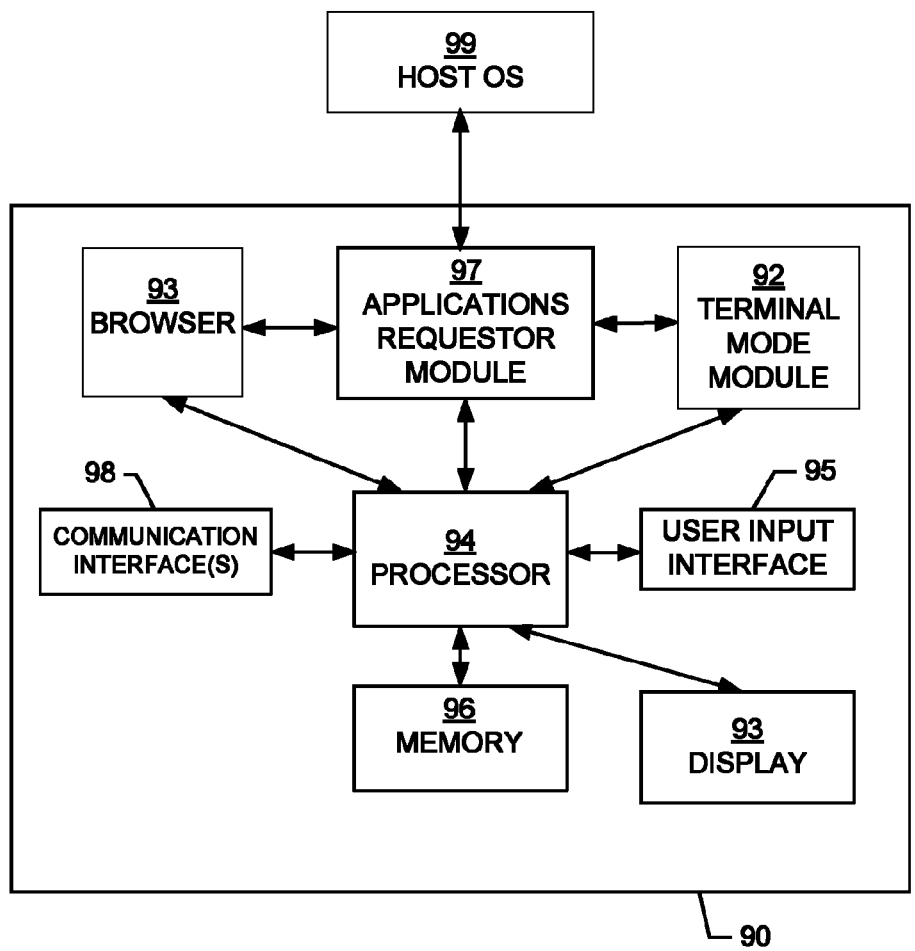
Figure 4:
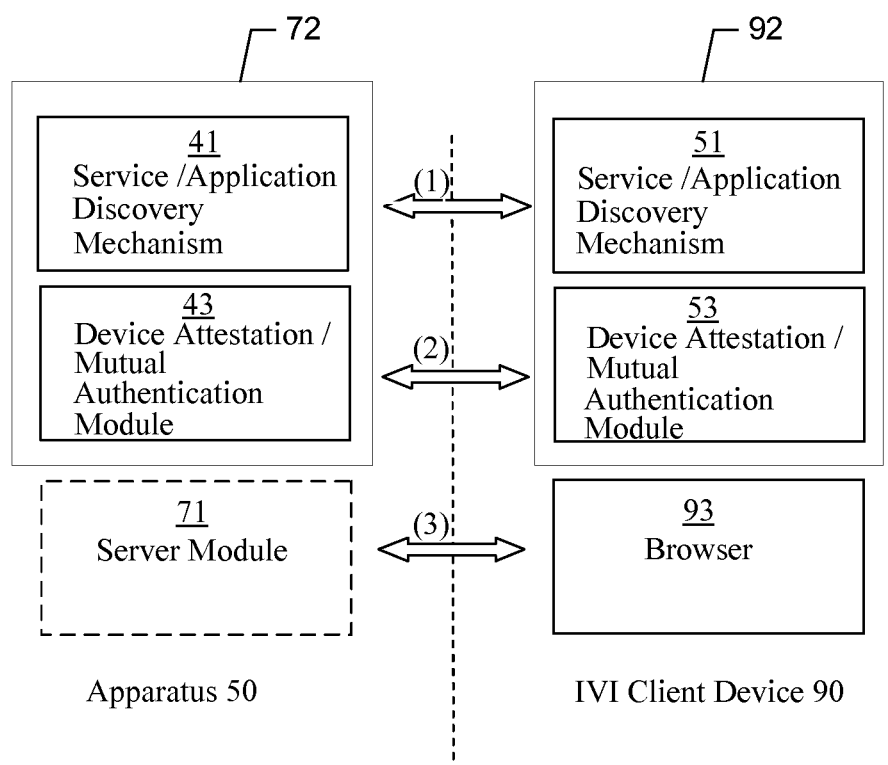
Figure 5:
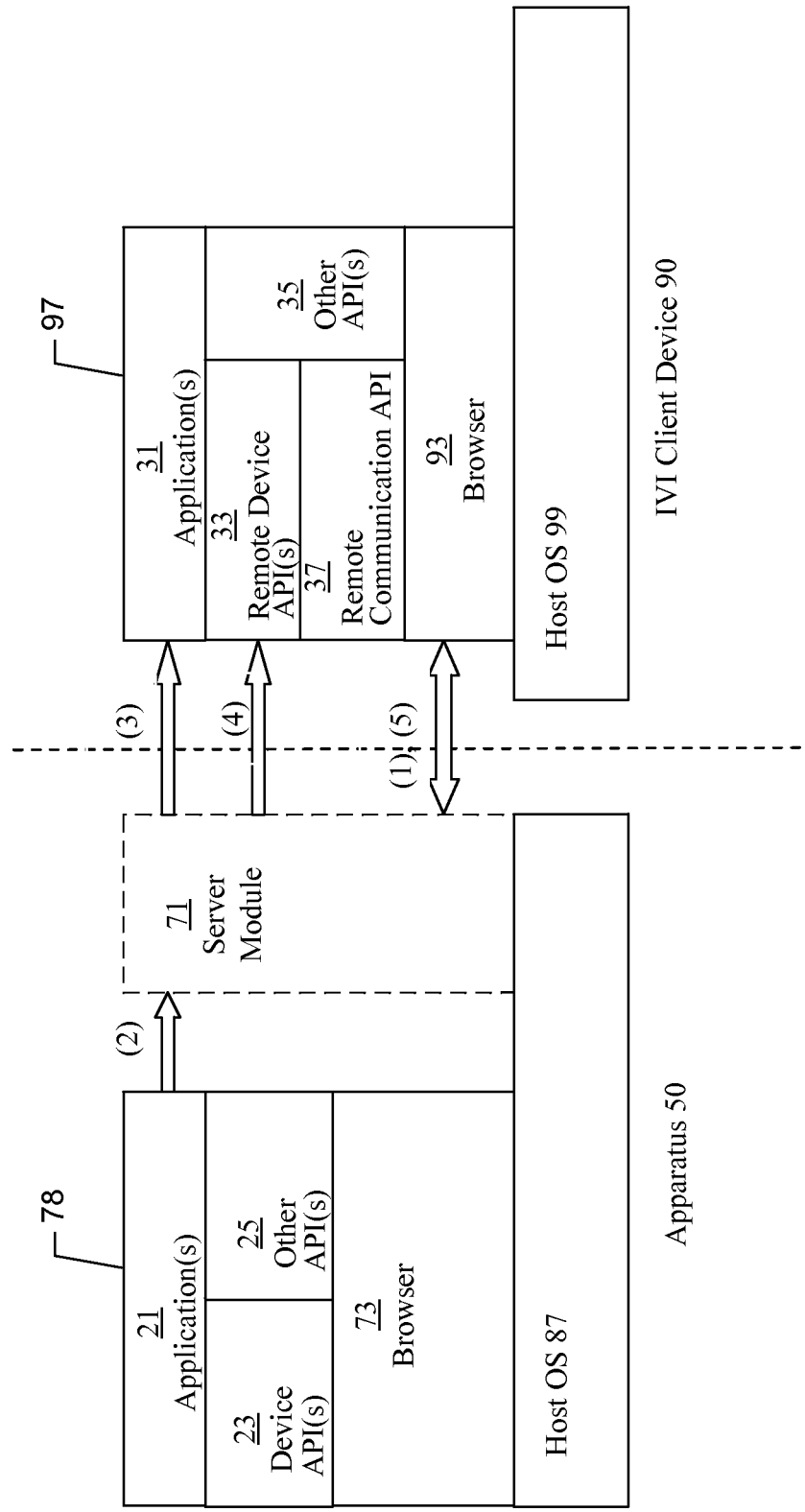
Figure 6:
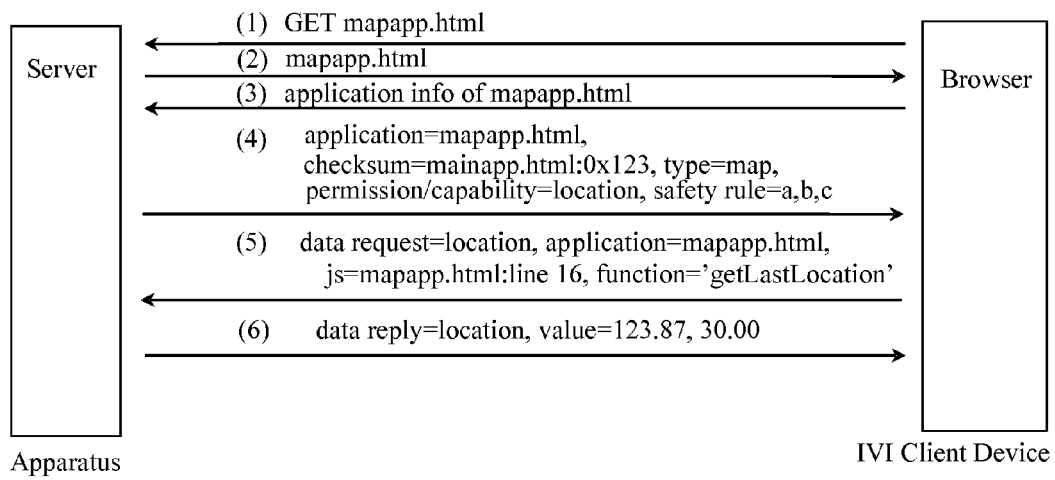
Figure 7:
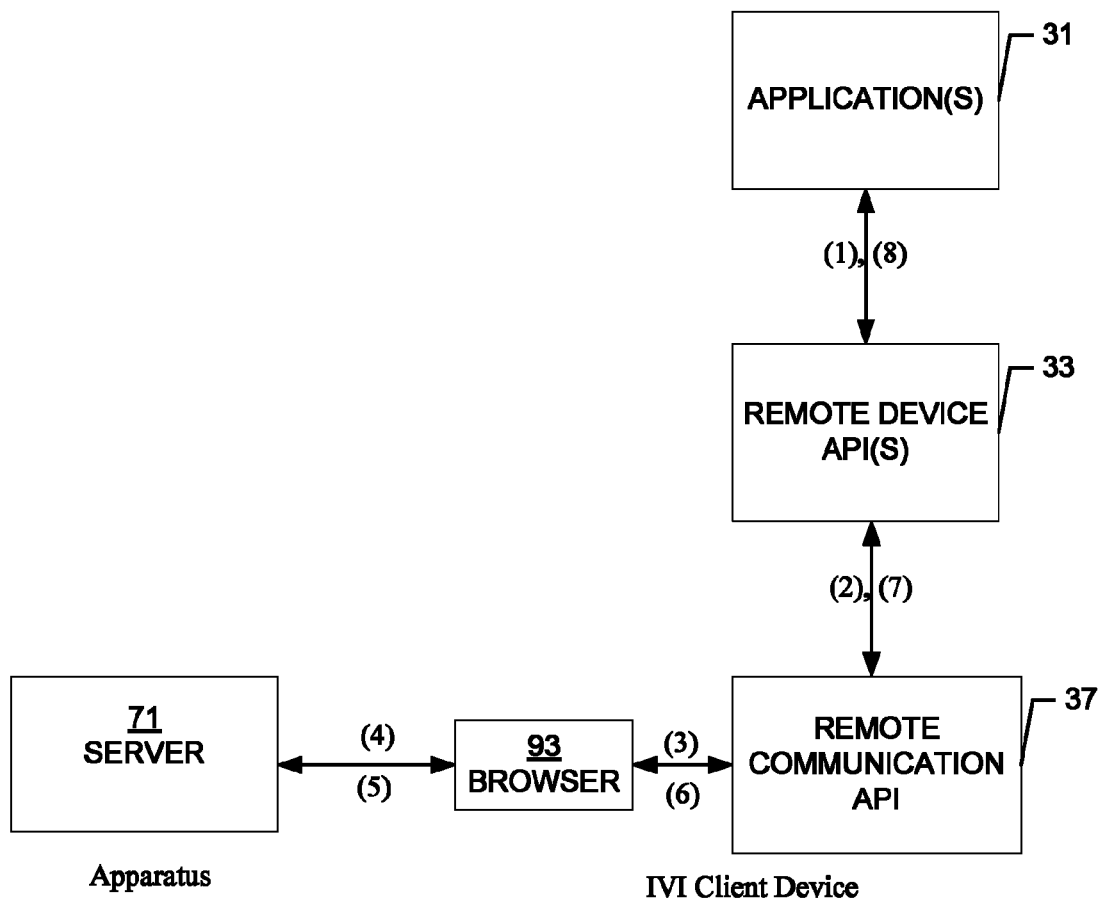
Figure 8:
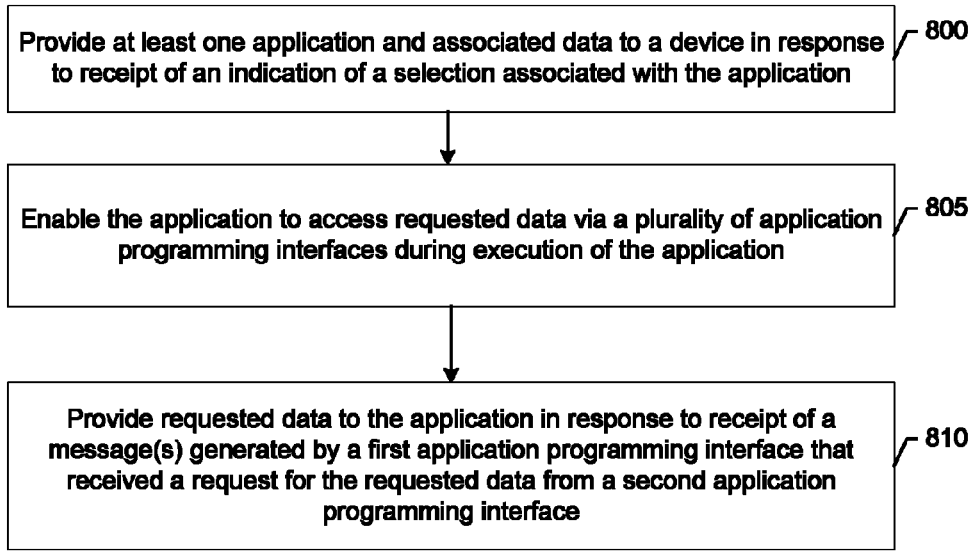

Having thus described the invention in general terms, reference will now be made to the accompanying drawings, which are not necessarily drawn to scale, and wherein:

FIG. 1 is a schematic block diagram of a system according to an example embodiment of the invention;

FIG. 2 is a schematic block diagram of an apparatus according to an example embodiment of the invention;

FIG. 3 is a schematic block diagram of an IVI client device according to an example embodiment of the invention;

FIG. 4 is a schematic block diagram illustrating communications by an apparatus and an IVI client device according to an example embodiment of the invention;

FIG. 5 is a schematic block diagram of a system according to an example embodiment of the invention;

FIG. 6 is a diagram illustrating messages exchanged between an apparatus and an IVI client device according to an example embodiment of the invention;

FIG. 7 is a diagram illustrating messages for providing requested data to an application(s); and FIG. 8 illustrates a flowchart for providing one or more applications to an IVI client data according to an example embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

As referred to herein a device API(s) (also referred to herein as remote device API) may denote an application programming interface corresponding to a set of one or more rules and specifications that applications may utilize to communicate with each other. In this regard, a device API may serve as an interface between corresponding applications, software programs and the like and may facilitate interaction between the applications. Additionally, a device API(s) as referred to herein may serve to define vocabularies or terminologies and resource request conventions (e.g., function-calls) for corresponding applications. Moreover, a device API(s) as referred to herein may include data associated with specifications for routines, data structures, object classes, protocols and the like that may be used to communicate between a corresponding application(s) and the corresponding device API.

FIG. 1 illustrates a generic system diagram in which a device such as a mobile terminal 10 is shown in a communication environment according to some example embodiments. As shown in FIG. 1, a system in accordance with some example embodiments may include a first communication device (for example, mobile terminal 10) and a second communication device 20 capable of communication with each other via a network 30. In some cases, embodiments of the present invention may further include one or more additional communication devices, one of which is depicted in FIG. 1 as a third communication device 25. In some embodiments, not all systems that employ an embodiment of the present invention may comprise all the devices illustrated and/or described herein. While example embodiments of the mobile terminal 10 and/or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, audio/video players, radios, global positioning system (GPS) and/or Global Navigation Satellite System (GLONASS) devices, Bluetooth headsets, Universal Serial Bus (USB) devices or any combination of the aforementioned, and other types of voice and text communications systems, can readily employ embodiments of the present invention. Furthermore, devices that are not mobile, such as servers and personal computers may also readily employ embodiments of the present invention.

The network 30 may include a collection of various different nodes (of which the second and third communication devices 20 and 25 may be examples), devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. According to some example embodiments the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE) or Evolved Universal Terrestrial Radio Access Network (E-UTRAN), Self Optimizing/Organizing Network (SON) intra-LTE, inter-Radio Access Technology (RAT) Network and/or the like. According to some example embodiments, the network 30 may be a point-to-point (P2P) network.

One or more communication terminals such as the mobile terminal 10 and the second and third communication devices 20 and 25 may be in communication with each other via the network 30 and each may include an antenna or antennas for transmitting signals to and for receiving signals from one or more base sites. The base sites could be, for example one or more base stations (BS) that is a part of one or more cellular or mobile networks or one or more access points (APs) that may be coupled to a data network, such as a Local Area Network (LAN), Wireless Local Area Network (WLAN), a Wi-Fi Network, a Metropolitan Area Network (MAN), and/or a Wide Area Network (WAN), such as the Internet. In turn, other devices such as processing elements (for example, personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other. For example, the mobile terminal 10 and the second and third communication devices 20 and 25 as well as other devices may communicate according to numerous communication protocols including Hypertext Transfer Protocol (HTTP) and/or the like, to thereby carry out various communication or other functions of the mobile terminal 10 and the second and third communication devices 20 and 25, respectively.

Furthermore the mobile terminal 10 and the second and third communication devices 20 and 25 may communicate in accordance with, for example, Radio Frequency (RF), Cellular, Near Field Communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (Wi-Fi), Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

According to some example embodiments, the first communication device (for example, the mobile terminal 10) may be a mobile communication device such as, for example, a wireless telephone or other devices such as a personal digital assistant (PDA), mobile computing device, camera, video recorder, audio/video player, positioning device, game device, television device, radio device, or various other like devices or combinations thereof. The second communication device 20 and the third communication device 25 may be mobile or fixed communication devices. However, in one example, the second communication device 20 and the third communication device 25 may be servers, remote computers or terminals such as personal computers (PCs) or laptop computers.

According to some example embodiments, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities.

According to some example embodiments, the mobile terminal as well as the second and third communication devices 20 and 25 may employ an apparatus (for example, apparatus of FIG. 2) capable of functioning according to example embodiments of the invention. In some example embodiments, the second and third communication devices may, but need not, be IVI client devices. The IVI client devices may be embodied within respective vehicles.

FIG. 2 illustrates a schematic block diagram of an apparatus for enabling provision one or more applications to one or more IVI client devices according to some example embodiments. Some example embodiments of the invention will now be described with reference to FIG. 2, in which certain elements of an apparatus 50 are displayed. The apparatus 50 of FIG. 2 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, an embodiment may be employed on a combination of devices. Accordingly, some embodiments of the invention may be embodied wholly at a single device (for example, the mobile terminal 10), by a plurality of devices in a distributed fashion (for example, on one or a plurality of devices in a P2P network) or by devices in a client/server relationship. Furthermore, it should be noted that the devices or elements described below may not be mandatory and thus some may be omitted in some embodiments.

Referring now to FIG. 2, the apparatus 50 may include or otherwise be in communication with a processor 70, a user interface 67, a communication interface 74, a memory device 76, a display 85, an optional server module 71 (also referred to herein as server 71), a browser 73, an applications manager module 78, a terminal mode module 72 and a host operating system (OS) 87. The OS 87 may coordinate some activities associated with the apparatus 50. For example, the OS 87 may coordinate activities for sending one more applications and/or associated data to one or more IVI client devices and may coordinate any other suitable activities. According to some example embodiments, the display 85 may be a touch screen display. The memory device 76 may include, for example, volatile and/or non-volatile memory. For example, the memory device 76 may be an electronic storage device (for example, a computer readable storage medium) comprising gates configured to store data (for example, bits) that may be retrievable by a machine (for example, a computing device like processor 70). In some embodiments, the memory device 76 may be a tangible memory device that is not transitory. The memory device 76 may be configured to store information, data, files, applications (e.g., Web applications (e.g., Hypertext Transfer Protocol (HTML) applications, etc.)), instructions or the like for enabling the apparatus to carry out various functions in accordance with example embodiments of the invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content (for example, pictures, videos, etc.).

The apparatus 50 may, according to some example embodiments, be a mobile terminal (for example, mobile terminal 10) or a fixed communication device or computing device configured to employ example embodiments of the invention. According to some example embodiments, the apparatus 50 may be embodied as a chip or chip set. In other words, the apparatus 50 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus 50 may therefore, in some cases, be configured to implement embodiments of the invention on a single chip or as a single "system on a chip." As such, in some cases, a chip or chipset may constitute means for performing one or more operations for providing the functionalities described herein. Additionally or alternatively, the chip or chipset may constitute means for enabling user interface navigation with respect to the functionalities and/or services described herein.

The processor 70 may be embodied in a number of different ways. For example, the processor 70 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In some example embodiments, the processor 70 may be configured to execute instructions stored in the memory device 76 or otherwise accessible to the processor 70. As such, whether configured by hardware or software methods, or by a combination thereof, the processor 70 may represent an entity (for example, physically embodied in circuitry) capable of performing operations according to embodiments of the invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and operations described herein when the instructions are executed. However, in some cases, the processor 70 may be a processor of a specific device (for example, a mobile terminal or network device) adapted for employing embodiments of the invention by further configuration of the processor 70 by instructions for performing the algorithms and operations described herein. The processor 70 may include, among other things, a clock, an arithmetic logic unit (ALU) and logic gates configured to support operation of the processor 70.

In some example embodiments, the processor 70 may be configured to operate a connectivity program, such as a browser 73 (e.g., Web browser) or the like. In this regard, the connectivity program may enable the apparatus 50 to transmit and receive Web content, such as for example location-based content or any other suitable content (e.g., applications), according to a Wireless Application Protocol (WAP) (e.g., an HTML Application Protocol), for example. In one example embodiment, the processor 70 may optionally be configured to operate a server module 71 (e.g., a Web server module) which may deliver content (e.g., one or more applications) to one or more devices. The content that may be delivered to one or more devices (e.g., a browser of a client device(s) (e.g., an IVI client device) may be accessed via a network (e.g., network 30 (e.g., Internet)) and/or accessed from the memory device 76. In an example embodiment, the server module 71 may accept one or requests from a browser (e.g., browser 73, browser 93 of FIG. 3) and may respond to the requests by sending applications (e.g., HTML applications (e.g., HTML5 applications)), Web pages, documents (e.g., HTML documents), files, etc. to the browser. In an alternative example embodiment, the processor 70 may execute the browser 73 to generate one or more requests that may be sent to an external network device (for example a server (e.g., Web server)) and the external network device may respond by sending applications (e.g., HTML applications), Web pages, documents (e.g., HTML documents), files, etc. to the apparatus 50.

The communication interface 74 may be any means such as a device or circuitry embodied in either hardware, a computer program product, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (for example, network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 67 may be in communication with the processor 70 to receive an indication of a user input at the user interface 67 and/or to provide an audible, visual, mechanical or other output to the user. As such, the user interface 67 may include, for example, a keyboard, a mouse, a joystick, a display, a touch screen, a microphone, a speaker, or other input/output mechanisms. In some example embodiments in which the apparatus is embodied as a server or some other network devices, the user interface 67 may be limited, remotely located, or eliminated. The processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (for example, software and/or firmware) stored on a memory accessible to the processor 70 (for example, memory device 76, and/or the like).

The terminal mode module 72 may be in communication with the processor 70 and the applications manager module 78. The terminal mode module 78 may be any means such as a device or circuitry operating in accordance with software or otherwise embodied in hardware or a combination of hardware and software, configured to perform the corresponding functions of the terminal mode module 72, as described more fully below. For example, the terminal mode module 72 may be configured to discover a connection of the apparatus 50 to an IVI client device(s). The connection may, but need not be established via a Universal Plug and Play (UPnP) connection. Additionally, the terminal mode module 72 may perform authentication to verify that an IVI client device(s) may be trusted and is executing a browser or server. The terminal mode module 72 may perform authentication to determine whether an IVI client device(s) may be trusted by executing a Trusted Computing Group (TCG) protocol or alternatively performing a certificate based authentication according to Hypertext Transfer Protocol Secure (HTTPS) and/or Transport Layer Security (TLS) protocols as well as in any other suitable manner. In response to detection, by the terminal mode module 72, of a successful authentication, the terminal mode 72 may establish one or more secure channels between the apparatus 50 and the IVI client device(s) to exchange application specific information and device data as well as any other suitable data. The secure channels may but need not be Hypertext Transfer Protocol Secure (HTTPS) channels, Transport Layer Security (TLS) channels or any other suitable secure channels.

In some example embodiments, the processor 70 may be embodied as, include or otherwise control the applications manager module 78. The applications manager module 78 may be any means such as a device or circuitry operating in accordance with software or otherwise embodied in hardware or a combination of hardware and software (for example, processor 70 operating under software control, the processor 70 embodied as an ASIC or FPGA specifically configured to perform the operations described herein, or a combination thereof) thereby configuring the device or circuitry to perform the corresponding functions of the applications manager module 78, as described below. Thus, in an example in which software is employed, a device or circuitry (for example, the processor 70 in one example) executing the software forms the structure associated with such means.

The applications manager module 78 may provide one or more applications (for example, HTML applications (e.g., HTML5 applications)) and/or associated data to one or more IVI client devices to enable the IVI client devices to utilize the applications. For instance, an IVI client device(s) may not have a device API capable of enabling a corresponding application to be implemented by the IVI client device(s). In this regard, the applications manager module 78 may provide the IVI client device a corresponding device API. The applications and/or data associated data provided by the applications manager module 78 to the IVI client device(s) may be stored in memory device 76 and/or may be obtained via server module 71 or alternatively obtained from an external network device (e.g., a server).

The associated data corresponding to an application(s) that the applications manager module 78 may send to an IVI client device(s) may include one or more driver distraction rules/regulations, permission data as well any other suitable data, as described more fully below. For example, the driver distraction rules/regulations may be associated with data indicating rules as to whether an application(s) is allowed to be scrolled via a screen or display of an IVI client device, and may specify a minimum font sized for usage, a minimum response time of a user interface, and other suitable rules, as described more fully below. Also for example, the permission data may relate to an allowed capability or data access permission of an application(s). For purposes of illustration and not of limitation, the permission data may, but need not, indicate whether a corresponding application(s) may access location data of a user (e.g., location data of a vehicle that includes a corresponding IVI client device). The permission data may include data indicating any other suitable indications, allowed capabilities and/or data access permission of one or more corresponding applications, as described more fully below.

Referring now to FIG. 3, a schematic block of an IVI client device according to an example embodiment is provided. According to some example embodiments, the IVI client device 90 may be embodied within a vehicle. In some example alternative embodiments, the IVI client device 90 may be a standalone device. The host operating system 99 may provide services for execution of various operations of the IVI client device. As shown in FIG. 3, the IVI client device 90 generally includes a processor 94 and an associated memory 96. The memory 96 may comprise volatile and/or non-volatile memory, and may store content, data and/or the like. For example, the memory may store content, data, information, and/or the like transmitted from, and/or received by, the IVI client device. Also for example, the memory 96 may store client applications, instructions, and/or the like for the processor 94 to perform the various operations of the IVI client device in accordance with example embodiments of the invention, as described herein. The memory 96 may also store one or more applications (for example, Web applications (e.g., HTML applications)) and associated data (for example, driver distraction rules/regulations, permission data, etc.) as well as any other suitable information.

In addition to the memory 96, the processor 94 may also be connected to at least one interface or other means for displaying, transmitting and/or receiving data, content, and/or the like. In this regard, the interface(s) may comprise at least one communication interface 98 or other means for transmitting and/or receiving data, content, and/or the like, as well as at least one user input interface 95. The user input interface 95, in turn, may comprise any of a number of devices allowing the network device to receive data from a user, such as a keypad, a touch display, a joystick or other input device. In this regard, the processor 94 may comprise user interface circuitry configured to control at least some functions of one or more elements of the user input interface. The processor and/or user interface circuitry of the processor may be configured to control one or more functions of one or more elements of the user interface through computer program instructions (for example, software and/or firmware) stored on a memory accessible to the processor (for example, volatile memory, non-volatile memory, and/or the like).

The display 93 may be in communication with the processor 94. The display 93 may be configured to show data associated with one or more applications as well as any other suitable data (e.g., video data, image data, etc.). In an example embodiment, the display 93 may be a touch screen display. The terminal mode module 92 may be in communication with the processor 94 and the applications requestor module 97. The terminal mode module 92 may be any means such as a device or circuitry operating in accordance with software or otherwise embodied in hardware or a combination of hardware and software, configured to perform the corresponding functions of the terminal mode module 92, as described more fully below. For example, the terminal mode module 92 may be configured to discover a connection of the IVI client device 90 to the apparatus 50. The connection may, but need not, be established via a UPnP connection. In this regard, in an instance in which the IVI client device 90 may be connected to a network (e.g., network 30), the IVI client device 90 and the apparatus 50 may discover each other's presence on the network and may share/exchange communications.

Similar to the terminal mode module 72, the terminal mode module 92 may perform authentication to verify that an apparatus 50 may be trusted and is executing a browser or server. The terminal mode module 92 may perform authentication to determine whether the apparatus 50 may be trusted by executing a TCG protocol or alternatively performing a certificate based authentication according to HTTPS and/or TLS protocols as well as in any other suitable manner. In response to detection, by the terminal mode module 92, of a successful authentication, the terminal mode 92 may establish one or more secure channels between the apparatus 50 and the IVI client device 90 to exchange one or more applications and/or associated data as well as any other suitable data. As described above, the secure channels may but need not be HTTPS channels, TLS channels or any other suitable secure channels.

The browser 93 (e.g., a Web browser) may request (e.g., an HTTP request) data from the apparatus 50. In an example embodiment, the browser 93 may request one or more applications (for example, Web applications (e.g., HTML applications)) and/or associated data, a corresponding device API(s) and any other suitable data from the apparatus 50. The request(s) generated by the browser 93 may be received the server module 71 which may provide the requested data to the IVI client device 90. In another example embodiment, the request(s) may be received by the processor 70 and the processor 70 may obtain the requested data from a device (for example a network device (e.g. a server)) and may provide the data to the browser 93.

The applications may relate to applications that may not be stored in the memory 96 of the IVI client device 90. In instances in which a corresponding application(s) may be stored in memory 96, the received data may relate to a request to the apparatus 50 for a corresponding device API(s) to facilitate implementation of the corresponding application(s), for example.

In some example embodiments, the processor 94 may be embodied as, include or otherwise control the applications requestor module 97. The applications requestor module 97 may be any means such as a device or circuitry operating in accordance with software or otherwise embodied in hardware or a combination of hardware and software (for example, processor 94 operating under software control, the processor 94 embodied as an ASIC or FPGA specifically configured to perform the operations described herein, or a combination thereof) thereby configuring the device or circuitry to perform the corresponding functions of the applications requestor module 97, as described below. Thus, in an example in which software is employed, a device or circuitry (for example, the processor 94 in one example) executing the software forms the structure associated with such means.

The applications requestor module 97 may receive indications (e.g., a list) of one or more applications stored by the apparatus 50, from the applications manager module 78, in response to detection of connection by the terminal mode module 92. In one example embodiment, the applications requestor module 97 may receive the indications of the one or more applications in response to the terminal mode module 92 discovering the apparatus 50, authenticating the apparatus 50 and establishing one or more secure connections between the IVI client device 90 and the apparatus 50. These indications may, but need not, correspond to visible indicia such as, for example, one or more corresponding icons shown on the display 93. In response to receipt of an indication of a selection (for example, by a user) of an item of visible indicia (e.g., an icon(s)), the applications requestor module 97 may generate a request that may be sent by the browser 93 to the apparatus 50 requesting that the apparatus 50 send the application corresponding to the selected item of visible indicia and/or associated data.

In an example embodiment, the applications requestor module 97 may include data in the request specifying whether the IVI client device 90 has (for example, stored in memory 96) a device API associated with the corresponding application. In an instance in which the applications requestor module 97 includes data in the request indicating that the IVI client device 90 does not have a corresponding device API, the applications manager module 78 may send a corresponding device API along with the corresponding application to the applications requestor module 97. As such, the apparatus 50 may provide a device API (for example, a remove device API (e.g., a JavaScript remote device API)) together with an application that is being requested based on a receipt of a selection of an icon associated with the application. In one example embodiment, the device API may correspond to a library which may include one or more call functions, routines, protocols associated with a corresponding application and any other suitable data.

By utilizing an example embodiment in instances in which the IVI client device 90 may store (e.g., pre-stored) some device APIs but not necessarily have a particular device API corresponding to a new desired application(s), the IVI client device 90 may obtain the device API and the corresponding desired application(s) from the apparatus 50, in the manner described above.

In an alternative example embodiment, in response to the terminal mode module 92 indicating to the applications requestor module 97 that the IVI client device 90 and the apparatus 50 are connected, the applications requestor module 97 may send indications of applications that are stored in memory 96 to the apparatus 50 and the applications manager module 78 may send indications of applications and associated data to applications requestor module 97 related to applications that are not stored in memory 96. In this regard, storage capacity of the memory 96 may be conserved by not sending, the applications requestor module 97, one or more indications of applications that may be stored by a memory (e.g., memory 96) of the IVI client device 90.

As described above, the applications manager module 78 may provide data that is associated with an application(s) corresponding to a selected item of visible indicia (e.g., an icon) to the applications requestor module 97. In an example embodiment, the associated data may include but is not limited to one or more driving distraction rules/regulations and/or permission data, etc. The driving distraction rules/regulations and the permission data may be maintained within a certificate (e.g., a digital certificate), which may be encrypted (for example, by using a digital signature (e.g., associated with a security key). In an example embodiment, the driving distraction rules/regulations may be issued by a manufacturer of a vehicle and/or one or may relate to one more laws of a country, state, city, or any other suitable entity, etc. The driving distraction rules/regulations may relate to requirements that may need to be met by an application(s) in order for the application(s) to be utilized by the IVI client device 90 or at least to be utilized by the IVI client device 90 while a vehicle maintaining the IVI client device 90 is in transit. If the application does not meet one or more of the regulations, the applications requester module 78 may not execute the application(s) while the vehicle is being driven. Some examples of driving distraction rules/regulations may include, but are not limited to, disallowing video associated with an application to be played, prohibiting automatically scrolling text shown on a display (e.g., display 93), a font size of text not to exceed a certain size, a touch time response of a user interface that should occur within a certain time period, etc. In an instance in which the applications requestor module 97 determines that a corresponding application violates any of the driving distraction rules/regulations, the applications requestor module 97, may not execute corresponding application at least not while the vehicle having the IVI client device 90 is being driven.

In an example embodiment, the applications requestor module 97 may determine whether a corresponding application violates any of the driving distraction rules/regulations by communicating with the apparatus 50 and asking the applications manager module 78 to provide the applications requestor module 97 with the corresponding distraction rules/regulations. In this regard, the applications manager module 78 may utilize a security key (e.g., a secret key, a public key, a private key, etc.) to access the distraction rules/regulations in the certificate and may provide the distraction rules/regulations to the applications requestor module 97. The applications requestor module 97 may analyze the distraction rules/regulations to determine whether the corresponding application(s) meets the distraction rules/regulations.

In an alternative example embodiment, the applications manager module 78 may provide the certificate to the applications requestor module 97 and the applications requestor module 97 may utilize a key (e.g., a secret key, a public key, a private key etc.) to access the certificate to determine the distraction rules/regulations and for determining whether the corresponding application meets the distraction rules/regulations.

The certificate may also include permission data indicating one or more permissions of usage for a corresponding application(s). The permission data may specify whether certain functions of a corresponding application(s) are allowed. For purposes of illustration and not of limitation, the permission data may indicate that a corresponding application(s) does not have permission to access location data and/or may specify that a user is prohibited from interacting with a user interface associated with an application while a vehicle is being driven, etc. As such, the applications requestor module 97 may execute the corresponding application(s) according the permission data.

Referring now to FIG. 4, a diagram illustrating communications between an apparatus and an IVI client device according to an example embodiment is provided. The terminal mode module 72 and the optional server module 71 of the apparatus 50 are shown in the example of FIG. 4. Additionally, the terminal mode module 92 and the browser 93 of the IVI client device 90 are shown in the example embodiment of FIG. 4. In the example embodiment of FIG. 4, an overall architecture for generating initial steps to run/execute one or more applications at the IVI client device 90 is provided. At operation 1, the service/application discovery mechanism 41 may be implemented by the terminal mode module 72 to find or identify a server service (e.g., server module 71 (e.g., Web server) of the apparatus 50. Also, at operation 1, the service/application discovery mechanism 51 may be implemented by the terminal mode module 92 to find or identify a browser (e.g. browser 93) service of the IVI client device 90. The service/application discovery mechanism 41 and the service/application discovery mechanism 51 may utilize a UPnP device and/or a service discovery/advertisement to find or identify the web service and the browser.

Once matching services are found, at operation 2, the device attestation or mutual authentication modules 43, 53 may verify each others trust and that the apparatus 50 and the IVI client device 90 are running an authentic web server or browser to ensure that the server and browser are not implementing malware. As an example, the device attestation or mutual authentication modules 43, 53 may perform the verification based in part on implementing one or more attestation procedures defined by TCG or a certificate-based mutual authentication as defined in TLS or HTTPS. At operation 3, in response to a detection of a successful attestation/authentication, the server module 71 and browser 93 may establish one or multiple secure channels to deliver one or more applications and/or application specific information and device data between each other. In an example embodiment a secure channel may be a HTTPS channel, a TLS channel, or other suitable network connection with data encryption.

Referring now to FIG. 5, a system and method for providing one or more applications to an IVI client device according to example embodiment is provided. In the system of FIG. 5, the applications manager module 78 may include one or more applications 21 (also referred to herein as application(s) 21), one or more device APIs 23 (also referred to herein as device API(s) 23 and one or more other APIs (also referred to herein as other API(s) 25. Additionally, the applications requestor module 97 may include one or more application(s) 31, (also referred to herein as application(s) 31), one or more remote device API(s) (also referred to herein as remote device API(s) 33 (e.g., a JavaScript remote device API(s))), one or more other APIs (also referred to herein as other API(s)) and a remote communication API 37. In an example embodiment, the other API(s) 25 and the other API(s) 35 may be JavaScript APIs which may be either platform independent or platform dependent but not necessarily associated with data of a user. In one example embodiment, the other API(s) 25 and the other API(s) 35 may be one or more libraries such as, for example, respective math libraries which may have no dependency on an underlying platform. In another alternative example embodiment, the other API(s) 25 and the other API(s) 35 may be respective Web-based Graphics Library (WebGL) APIs which may provide standard APIs for accessing graphics hardware for one or more web applications.

At operation 1, an IVI client device 90 may request an application from an apparatus 50 (e.g., mobile terminal 10). In this regard, the browser 93 of IVI client device 90 may generate a request for an application (e.g., a request for an application(s) 21) and may send the request to the server module 71 of the apparatus 50. In response to receipt of the request for the application the server module 71 may retrieve information, including but not limited to, a type of the application being requested, one or more corresponding driving distraction rules/regulations supported by the application, permission data and any other suitable information.

At operations 2 and 3, the server module 71 may transmit the requested application (e.g., an application(s) 31 which may correspond to an application(s) 21) to the IVI client device 90. At operation 4, the remote device API (e.g., a JavaScript (JS) remote device API(s)) may correspond to the device API 23 of the apparatus 50. As such, in an example embodiment software code associated with the device API(s) 23 may, but need not be, the same as software code for the remote device API(s) 33. In an example embodiment, the remote device API(s) 33 may be pre-stored in a memory of the IVI client device 90 or the applications requestor manager 97. However, in another example embodiment, the remote device API(s) 33 may be received from the apparatus 50 (for example, from the server module 71). As an example, the IVI client device 90 may receive the remote device API(s) 33 from the apparatus 50 in response to a request for a corresponding application in an instance in which the request, generated by the applications requestor module 97, may include information indicating that the IVI client device 90 does not have a corresponding remote device API(s).

The remote device API(s) 33 (e.g., a JS remote device API(s)) may request information (e.g., device data), that may be required or needed for execution of the received application and/or for performing one or more functions of the received application, from the remote communication API 37 (e.g., a JS remote communication API) At operation 5, in response to receipt of the request, the remote communication API 37 may send a generated request to the apparatus 50 to fetch or retrieve the needed information (e.g., device data) from the apparatus 50. As such, the IVI client device 90 itself does not necessarily need to provide device data associated with the remote device API(s) 33. It should be pointed out that the remote communication API 37 may utilize a secure communication channel (a HTTPS channel, TLS channel, etc.) to ensure secure communication in an instance in which the remote communication API 37 may send a request to the apparatus 50 for needed information (e.g., device data).

Although the server module 71 may perform some functions of the system of FIG. 4, described above, associated with receiving requests for applications and associated data as well as needed information (e.g., device data), it should be pointed out that in an alternative embodiment, a processor (e.g., processor 70) may receive the requests from the IVI client device 90. In this regard, the processor may retrieve corresponding information locally (e.g., from memory device 76) or from an external device (e.g., a network device (e.g., a server)) and may provide the retrieved data to the IVI client device 90. In this regard, the processor may provide the requested applications and/or associated data (e.g., driver distraction rules/regulations, permission data, etc.) as well as needed information (e.g., device data) and any other suitable data to the IVI client device 90.

Referring now to FIG. 6, a diagram illustrating messages being exchanged between an apparatus and an IVI client device according to an example embodiment is provided. At operation 1, the browser (e.g., browser 93) of an IVI client device (e.g., IVI client device 90) may generate a request (e.g., a HTTP GET request) for an application such as, for example, a map application (also referred to herein as mapapp). At operation 2, a server (e.g., server module 71) of apparatus 50 (e.g., mobile terminal 10) may send the requested application (e.g., a mapapp html file) to the browser 93. At operation 3, the browser may request information associated with the application from the server. At operation 4, the server may respond with the requested information. In this regard, the server may provide the browser with information indicating an application type of the application (e.g., mapapp html file), a checksum of necessary files, one or more allowed permissions (or capabilities) of the application, one or more driver distraction rules/regulations met by the application and any other suitable data.

The applications requestor module 97 may receive this information from the browser and may utilize the checksum to verify that all codes (e.g., software code) associated with the requested application are genuine and the browser may utilize the application type and driver distraction rules/regulations (e.g., Rules a, b, c, etc.) to decide whether to allow the application to be utilized while a vehicle is being driven. At operation 5, the received application (e.g., mapapp html file) may be executed in the IVI client device (for example, executed by the processor 94 and/or the applications requestor module 97) and the executed application may request location data from a device API (e.g., remote device API(s) 33). In this regard, the remote device API may generate a request for location data (e.g., data request=location, function='getLastLocation', etc.) and the generated request may be provided by the remote device API to a remote communication API (e.g., remote communication API 37). The remote communication API may generate a message requesting the location data. The generated message may be provided by the remote communication API to the browser which may send the message to the server in operation 5. By enabling the remote device API (e.g., remote device API(s) 33) to rely on the remote communication API (e.g., remote communication API 37) for accessing at least some data, the following benefits may be achieved. The remote communication API, may maintain a secure connection between an IVI client device (e.g., IVI client device 90) and an apparatus (e.g., apparatus 50 (for example, mobile terminal 10)) and as such the remote communication API may operate as a gatekeeper for critical data received from an apparatus by an IVI client device. Since the remote communication API may be embodied within an IVI client device, there is less chance for malware to override an API to access critical data of a user. Moreover, the remote communication API (e.g., remote communication API 37) of an example embodiment may, but need not, be a standardized API, which may be shared across different platforms.

In an example embodiment, the message generated by the remote communication API may include data indicating that a corresponding application (e.g., mapapp html (also referred to herein as mapapp.html)) is requesting location data in given JavaScript (JS) context (e.g., js=mapapp.html:line 16) and may indicate a function name (e.g., function='getLastLocation).

At operation 6, the server may enable verification that the application requesting the data has a valid permission to request the location data. For instance, the server may inform the applications manager module 78 that the IVI client device is requesting location data. As such, the applications manager module 78 may examine permission data in a certificate to determine whether the application is given permission to obtain location data. In an instance in which the applications manager module 78 determines that the permission data indicates that the application (e.g., mapapp html file) is allowed access to location data (e.g., latitude/longitude coordinates 123.87, 30.00), the applications manager module 78 may notify the server and the server may send the requested location data to the browser. In response to receipt of the location data from the browser, the applications manager module 78 and/or processor 94 may enable the application to utilize the location data.

It should be pointed out that in the example embodiment of FIG. 5 the messages exchanged between the server of the apparatus (e.g., apparatus 50) and the browser of the IVI client device (e.g., IVI client device 90) may be communicated across one or more secure channels (e.g., a HTTPS channel(s), a TLS channel(s), etc.) in operations 3-6. Although the messages of FIG. 5 may relate to a map application, for purposes of illustration and not of limitation, it should be pointed out that the messages may be associated with any other suitable applications (e.g., applications received from the apparatus 50) without departing from the spirit and scope of the invention.

Referring now to FIG. 7, a diagram illustrating messages for obtaining data requested by an application(s) according to an example embedment is provided. In the example embodiment of FIG. 7 an application(s) 31 may correspond to the application received from the server of FIG. 6. As described above, the received application (e.g., a mapping application (e.g., mapapp html)) may request data (e.g., location data) from a device API such as, for example, remote device API(s) 33. The request sent from the received application to the remote device API(s) 33 may relate to a function call such as, for example, getLastLocation. (See operation 1). In response to receipt of the request from the received application the remote device API(s) 33 may generate a request with data (e.g., data requesting that the function call getLast Location be performed) requesting that remote communication API 37 to obtain the requested data. In this regard, the generated request may be provided by the remote device API(s) 33 to the remote communication API 37. (See operation 2)

In response to receipt of the request from the remote device API(s) 33, the remote communication API 37 may analyze the data of the request to determine whether data being requested (e.g., location data) corresponds to an authorized or valid application. In an example embodiment, the remote communication API 37 may determine whether the requested data corresponds to a valid application in an instance in which the remote communication API 37 recognizes a function call (e.g., 'getLastLocation') of the request being sent by the remote device API(s) 33 as corresponding to data associated with the requesting application (e.g., the mapping application). In an instance in which the remote communication API 37 does not recognize a corresponding function call as corresponding to an application requesting data, the remote communication API 37 may stop the process of obtaining the requested data and may send a message to the processor 94 and/or the applications requestor module 97 specifying that the requesting application should no longer be executed. The message may include data indicating that the requesting application may be invalid and unauthorized to operate on the IVI client device. In this regard, the remote communication API 37 may provide a security measure by denoting that an application may be invalid.

On the other hand, in an instance in which the remote communication API 37 recognizes the call function(s) in the request sent from the remote device API 33, the remote communication API 37 may determine that the requesting application (for example, application(s) 31 (e.g., mapapp html)) is valid or authorized. As such, the remote communication API 37 may generate and may send a message to the browser 93 requesting the browser 93 to retrieve the requested data from the server. (See operations 3 & 4). In response, the browser 93 may send the message to the server and may receive the requested data (e.g., location data (e.g., latitude/longitude coordinates 123.87, 30.00)). (See operation 5) In response to receipt of the requested data from the server, the browser 93 may provide the requested data to the remote communication API 37. (See operation 6) Upon receipt of the requested data, the remote communication API 37 may provide the requested data to the remote device API 33 which may provide the requested data to the requesting application (e.g., application(s) 31 (e.g., mapapp html). (See operations 7 & 8). Upon receipt of the requested data, the requesting application may utilize the requested data (e.g., to provide coordinates of a vehicle maintaining the IVI client device).

Referring to FIG. 8, a flowchart of an example method for providing one or more applications to an IVI client device according to an example embodiment is provided. At operation 800, an apparatus (e.g., applications manager module 78) may provide at least one application (e.g., application(s) 31) and associated data (e.g., driver distraction rules/regulations, permission data, etc.) to a device (e.g., IVI client device 90) in response to receipt of an indication of a selection (e.g., a selection of an item of visible indicia (e.g., an icon)) associated with the application. At operation 805, an apparatus (e.g., applications manager module 78) may enable the application to access requested data via a plurality of application programming interfaces (e.g., remote device API(s) 33, remote communication API 37) during execution of the application. At operation 810, an apparatus (e.g., applications manager module 78) may provide the requested data to the application in response to receipt of at least one message generated by a first application programming interface (e.g., remote communication API 37) that received a request for the requested data from a second application programming interface (e.g., remote device API(s) 33). The second application programming interface may have received a message requesting the requested data from the application (e.g., application(s) 31).

It should be pointed out that FIG. 8 is a flowchart of a system, method and computer program product according to some example embodiments of the invention. It will be understood that each block of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, in some example embodiments, the computer program instructions which embody the procedures described above are stored by a memory device (for example, memory device 76, memory 96) and executed by a processor (for example, processor 70, processor 94, applications manager module 78, applications requestor manager 97). As will be appreciated, any such computer program instructions may be loaded onto a computer or other programmable apparatus (for example, hardware) to produce a machine, such that the instructions which execute on the computer or other programmable apparatus cause the functions specified in the flowchart blocks to be implemented. In some example embodiments, the computer program instructions are stored in a computer-readable memory that can direct a computer or other programmable apparatus to function in a particular manner, such that the instructions stored in the computer-readable memory produce an article of manufacture including instructions which implement the function(s) specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart blocks.

Accordingly, blocks of the flowchart support combinations of means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some example embodiments, an apparatus for performing the method of FIG. 8 above may comprise a processor (for example, the processor 70, the processor 94, the applications manager module 78, the applications requestor manager 97) configured to perform some or each of the operations (800-810) described above. The processor may, for example, be configured to perform the operations (800-810) by performing hardware implemented logical functions, executing stored instructions, or executing algorithms for performing each of the operations. Alternatively, the apparatus may comprise means for performing each of the operations described above. In this regard, according to some example embodiments, examples of means for performing operations (800-810) may comprise, for example, the processor 70 (for example, as means for performing any of the operations described above), the processor 94, the applications manager module 78, the applications requestor manager 97 and/or a device or circuitry for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
enabling provision of at least one application and associated data to a device in response to receipt of an indication of a selection associated with the application;
enabling the application to access requested data via a plurality of application programming interfaces during execution of the application; and
enabling, via a processor, provision of the requested data to the application in response to receipt of at least one message generated by a first application programming interface of the interfaces that received a request for the requested data from a second application programming interface of the interfaces.

2. The method of claim 1, wherein prior to enabling the application, the method further comprises:
enabling provision of the second application programming interface to the device in response to determining that the device did not previously comprise the second application programming interface.

3. The method of claim 1, wherein the device comprises an in vehicle infotainment device maintained by a vehicle, the in vehicle infotainment device configured to execute the application and utilize the associated data.

4. The method of claim 3, wherein enabling the application to access the requested data further comprises enabling the application to generate a message requesting the requested data from the second application programming interface.

5. The method of claim 3, wherein enabling provision of the requested data further comprises enabling provision of the requested data based in part in response to the first application programming interface determining from information of the request, received from the second application programming interface, that the application is valid.

6. The method of claim 3, wherein prior to enabling the application, the method further comprises:
determining that the indication of the selection denotes that the device does not previously comprise the application or does not comprise a current version of the application.

7. The method of claim 3, wherein the associated data comprises at least one of one or more driver distraction rules denoting criteria the application is expected to meet to be executed while the vehicle is being driven or items of data indicating one or more permissions of the application.

8. The method of claim 7, further comprising:
determining whether one or more features of the application may be utilized based in part on the content of the driver distraction rules; and
enabling provision of an indication to the device to enable the device to determine which features meet the criteria of the driver distraction rules.

9. The method of claim 7, further comprising:
analyzing the data indicating the permissions to determine whether one or more capabilities of the application are allowed or restricted; and
enabling sending of an indication to the device denoting the permissions to enable the device to determine the capabilities of the application that are allowed or restricted.

10. An apparatus comprising:
at least one processor; and
at least one memory including computer program code configured to, with the at least one processor, cause the apparatus to perform at least the following:
enable provision of at least one application and associated data to a device in response to receipt of an indication of a selection associated with the application;
enable the application to access requested data via a plurality of application programming interfaces during execution of the application; and
enable provision of the requested data to the application in response to receipt of at least one message generated by a first application programming interface of the interfaces that received a request for the requested data from a second application programming interface of the interfaces.

11. The apparatus of claim 10, wherein prior to enable the application, the memory and computer program code are configured to, with the processor, cause the apparatus to:
enable provision of the second application programming interface to the device in response to determining that the device did not previously comprise the second application programming interface.

12. The apparatus of claim 10, wherein the device comprises an in vehicle infotainment device maintained by a vehicle, the in vehicle infotainment device configured to execute the application and utilize the associated data.

13. The apparatus of claim 12, wherein the memory and computer program code are configured to, with the processor, cause the apparatus to:
enable the application to access the requested data by enabling the application to generate a message requesting the requested data from the second application programming interface.

14. The apparatus of claim 12, wherein the memory and computer program code are configured to, with the processor, cause the apparatus to:
enable provision of the requested data by enabling provision of the requested data based in part in response to the first application programming interface determining from information of the request, received from the second application programming interface, that the application is valid.

15. The apparatus of claim 12, wherein prior to enable the application, the memory and computer program code are configured to, with the processor, cause the apparatus to:
determine that the indication of the selection denotes that the device does not previously comprise the application or does not comprise a current version of the application.

16. The apparatus of claim 12, wherein the associated data comprises at least one of one or more driver distraction rules denoting criteria the application is expected to meet to be executed while the vehicle is being driven or items of data indicating one or more permissions of the application.

17. The apparatus of claim 16, wherein the memory and computer program code are configured to, with the processor, cause the apparatus to:
determine whether one or more features of the application may be utilized based in part on the content of the driver distraction rules; and
enable provision of an indication to the device to enable the device to determine which features meet the criteria of the driver distraction rules.

18. The apparatus of claim 16, wherein the memory and computer program code are configured to, with the processor, cause the apparatus to:
analyze the data indicating the permissions to determine whether one or more capabilities of the application are allowed or restricted; and
enable sending of an indication to the device denoting the permissions to enable the device to determine the capabilities of the application that are allowed or restricted.

19. A computer program product comprising at least one non-transitory computer-readable storage medium having computer-readable program code portions stored therein, the computer-readable program code portions comprising:
program code instructions configured to enable provision of at least one application and associated data to a device in response to receipt of an indication of a selection associated with the application;
program code instructions configured to enable the application to access requested data via a plurality of application programming interfaces during execution of the application; and
program code instructions configured to enable provision of the requested data to the application in response to receipt of at least one message generated by a first application programming interface of the interfaces that received a request for the requested data from a second application programming interface of the interfaces.

20. The computer program product of claim 19, wherein the device comprises an in vehicle infotainment device maintained by a vehicle, the in vehicle infotainment device configured to execute the application and utilize the associated data.

* * * * *